United States Patent
Lisson et al.

[11] Patent Number: 5,179,273
[45] Date of Patent: Jan. 12, 1993

[54] METHOD FOR TESTING OR CONTROLLING A PERFORMANCE OF AN ADAPTIVE OPTIC

[75] Inventors: Jerold B. Lisson, Henrietta; Victor L. Genberg, N. Chili, both of N.Y.

[73] Assignee: Eastman Kodak Company, Rochester, N.Y.

[21] Appl. No.: 893,993

[22] Filed: May 29, 1992

[51] Int. Cl.$^5$ ............................................. G01M 11/00
[52] U.S. Cl. ............................. 250/201.9; 356/124.5; 382/43
[58] Field of Search ................. 250/201.9; 356/124.5, 356/124, 121; 382/43, 65, 66

[56] References Cited

U.S. PATENT DOCUMENTS

| | | | |
|---|---|---|---|
| 4,582,427 | 4/1986 | Hutchin | 356/124.5 |
| 4,772,120 | 9/1988 | Pointeau | 356/124.5 |
| 4,804,269 | 2/1989 | Elterman | 250/201.9 |
| 5,126,550 | 6/1992 | Lisson et al. | 250/201.9 |

Primary Examiner—David C. Nelms
Assistant Examiner—John R. Lee
Attorney, Agent, or Firm—Stephen C. Kaufman

[57] ABSTRACT

A method for testing or controlling a performance of an adaptive optic. The method includes the steps of generating from the adaptive optic an augmented matrix comprising a local wavefront difference-error sensitivity matrix; and, a local optical quality factor sensitivity matrix; interrogating the adaptive optic by preferentially turning on selected laser sources which are directed into an entrance pupil of the adaptive optic, for recording a resultant diffraction pattern at an imaging plane; taking a Fourier transform of the resultant diffraction pattern, for generating magnitude and phase component at selected pupil positions; laser scanning the entrance pupil of the adaptive optic, for generating up to N samples of magnitude and phase components, thereby forming an observation vector; and solving for a force vector, for applying the force vector to the adaptive optic.

1 Claim, 3 Drawing Sheets

5,179,273

METHOD FOR TESTING OR CONTROLLING A PERFORMANCE OF AN ADAPTIVE OPTIC

BACKGROUND OF THE INVENTION

This invention relates to a method for designing and tolerancing an adaptive optic, and for a concatenate employment of the method for testing or controlling a performance of the optic.

INTRODUCTION TO THE INVENTION

Methods for designing an optic, for example, a lens, are known. In overview, lens design includes considerations of an effect that a design construction parameter perturbation, including, for example, perturbations of radius of curvature or index of refraction, may have on a wavefront error developed at a pupil plane of the lens, especially as a function of the wavefront error's effect on information transfer at critical spatial frequencies.

One important, typical, and currently used lens design tolerancing method is called the Code V system, an optical design and analysis program of the Optical Research Associates. To an end of contrasting and critiquing the Code V methodology, thereby pointing a way to the advantages secured by a novel lens design method that can be used for testing or controlling the performance of an optic, we first develop the mathematics subsumed by the Code V method.

In Code V, an effect of design construction parameter perturbations is accessed by way of a Taylor series expansion of a global i.e., non-local optical transfer function (OTF), for each pertinent construction parameter perturbation. To this end, Code V employs a differential ray trace (i.e., a change of wavefront error due to a unit perturbation of a construction parameter) for a matrix of rays that are separated by a constant distance within a lens pupil. We note that this spacing, which is proportional to transfer function spatial frequency, can give only those wavefront errors which impact the OTF at the selected spatial frequency, and is the Code V basis for a global OTF derived modulation/magnitude transfer function (MTF).

The global OTF at a normalized spatial frequency f is given by an autocorrelation of the complex pupil function, which results in the following formula:

$$OTF(s) = A^{-1} \int EXP[2xj(W(x) - W(x-s))]dx \quad (1)$$

where,
- W(x) is a wavefront error at an unshifted pupil and gives the wavefront error at a pupil location x;
- W(x−s) is the pupil shifted s units, and therefore gives the wavefront error at a pupil location x−s;
- s is the spacing between traced rays and is proportional to spatial frequency;
- A is the value of the OTF at s=0;
- $j = (-1)^{\frac{1}{2}}$; and
- integration is over the area common to the shifted and unshifted pupils.

The Code V system expands OTF(s) into a Taylor series which includes 2nd order terms, $$OTF(p + \delta p) = \int EXP(jV) + \quad (2)$$

$$j\int \frac{dV}{dp} EXP(jV)\delta p + \left[ -\frac{1}{2} \int \left[ \frac{dV}{dp} \right]^2 EXP(jV)\delta p^2 \right]$$

where,
- p is a nominal value of the p-th design construction parameter;
- δp is a perturbation of the p-th design construction parameter; and
- $V = 2\pi W_s(i) = 2\pi(W(x) - W(x-s))$ radians-the difference between the wavefront errors at pupil positions x and x−s.

The W(x)−W(x−s) function in the equation (1) exponent is particularly important, and represents the difference in the wavefront error (in wavelength units) at two locations in the pupil separated by a distance s proportional to transfer function spatial frequency. For simplicity, it is denoted hereafter as $W_s(i)$.

Note that equation (2) is not shown as a function of s, since only one value is computed. However, it is shown as a function of δp, to emphasize its use in determining the change in OTF as a function of perturbing construction parameter p. Also, since Code V considers the global OTF, integration over all x in the region common to the shifted and unshifted pupil, is implicit.

When the OTF is multiplied by its complex conjugate, the MTF-squared is obtained in the following form:

$$MTF^2(\delta p) = A\delta p^2 + B\delta p + C \quad (3)$$

where A, B and C are combinations of the integrals shown in equation 2. (We note that the PTF part of the OTF is irretrievably lost due to this operation.)

A direct tolerancing in terms of the MTF can now be implemented, using equation 3, by computing the MTF variation as each construction parameter (p) is varied over a range dictated by the precision of the manufacturing process. This can be accomplished by computing the change in the MTF using the above equation for each of say m parameters of the lens, using a Monte carlo sample for the corresponding perturbations δp(j) for j=1, 2 . . . m. The algebraic summation of each of the MTF changes gives one sample of the manufactured MTF. This monte carlo process can be repeated, say k times, in order to obtain a distribution of MTF values that characterize a high-volume manufacturing capability.

The tolerancing specification can now be based on the establishment of a maximal allowed percentage of product below a minimal MTF. If the distribution of k MTF values meets this criterion, the design is acceptable. If not, the nominal design parameters must be re-optimized, or the manufacturing tolerances must be tightened, redistributed or the lens redesigned.

SUMMARY OF THE INVENTION

As alluded to above, the important and typical Code V lens design tolerancing methodology has been developed to an end of critiquing it, thereby pointing a way, firstly, to the advantages secured by a novel lens design and tolerancing method and secondly, for the concatenate employment of this novel method, for testing or controlling a performance of an optic.

A critique of Code V follows from the fact that its lens performance tolerancing concentrates purely on the global magnitude (MTF) merit function. This follows, it is recalled, from the fact that in Code V, integration is over all X in the region common to the shifted and unshifted pupil.

Accordingly, while Code V can provide lens design tolerancing based only on a global MTF, we note that it may have an inadequacy since it cannot provide a lens design tolerancing based on local MTF at a sample pupil position. However, this capability, i.e., to provide a lens design tolerancing by incorporating local MTF considerations, can lead to significant design advantages, as outlined below.

Moreover, since Code V concentrates purely on the MTF merit function, it does not (implicitly) utilize the full OTF function, which also comprises a phase transfer function (PTF). Here, a critique of Code V, namely its silence on phase information, is that such a desideratum may be critical to the development of the tolerancing process. Phase information can be extremely useful, since it can be used to increase a robustness of the optimization of the design's imaging performance, prior to tolerancing.

Based on this critique of lens design methodologies which comprise only global magnitude assessment, as exemplified by Code V, we now disclose, first aspect, a novel method for designing and tolerancing an imaging device. The novel method comprises the steps of:

(a) characterizing the imaging device by generating an augmented sensitivity matrix comprising:
  (i) a local wavefront difference-error sensitivity matrix; and
  (ii) a local optical quality factor sensitivity matrix;
(b) ascertaining an augmented difference-error vector, an element of said augmented vector comprising a difference error magnitude or a local optical quality factor, at a particular local pupil location; and
(c) solving for a construction parameter vector by multiplying an inverse of the augmented matrix by the ascertained augmented difference-error vector.

The advantages of the novel method include inter alia:

(1) Inherent localized wavefront performance analysis (LWPA) allows an optimization and tolerancing of a lens by a local tailoring of its construction parameters, so that imaging performance is maximized at critical transfer function frequencies.

(2) The method uses the full optical transfer function (OTF), the best known correlate with imaging quality, comprised of a modulation transfer function (MTF) part and a phase transfer function (PTF) part-as the merit function in the optimization and tolerancing of the imaging lens. It uses a local sample value, which on averaging, gives corresponding global results.

(3) Since the method uses the full OTF, it utilizes more information for performance based tolerancing. When a design process enters a solution space, the method can achieve a maximally rapid convergence to nominal lens parameters that are optimized for the transfer of object information at critical spatial frequencies. Once accomplished, the same model can then be used for tolerancing studies in order to assess the effect of manufacturing capabilities on ultimate imaging performance. In summary, the method can be used for lens parameter optimization in addition to tolerancing.

(4) There is no need for a dependence on the Taylor's series expansion of the OTF. In contradistinction, the exact form shown in equation (1) can be used to directly obtain the full OTF.

(5) Multiple integral evaluations, as required in equation (2), are not required.

(6) In general, a matrix vector form which incorporates the construction parameter sensitivity matrix, allows the determination of the OTF when all construction parameters vary concurrently. Computations can proceed in parallel.

(7) In the case of overdetermined systems, least squares statistical techniques can be used to reduce the effect of sampling noise, which can be extremely serious when small perturbations (and correspondingly small changes in the OTF) are considered.

(8) Linearity can be enhanced when using both parts of the OTF, analogous to using the real and imaginary parts thereof. Hence, the sensitivity matrix can be a better first order approximation than the corresponding matrix for wavefront error alone.

(9) Imaging performance may be optimized by determining a total perturbation vector that when added to the previous construction parameter vector, results in an optimal OTF at specification transfer frequencies.

(10) The use of the local OTF allows a preferential weighting of regions of the pupil according to the impact of the sensitivity matrix on the global OTF. The larger difference-errors (indicative of poorest quality) are greater than the average difference error over the pupil. The larger values, in general, have a corresponding larger signal-to-noise ratio, thus, they can be reduced with greater certainty of attaining significant improvement in performance. Lower signal-to-noise errors are relatively less adjusted.

In a second aspect, the present invention comprises a method for testing or controlling a performance of an adaptive optic. The method includes the steps of:

1) generating from the adaptive optic an augmented matrix $$\begin{vmatrix} W_s(i,j) \\ L_s(i,j) \end{vmatrix}$$

comprising:
  (i) a local wavefront difference-error sensitivity matrix $W_s(i,j)$; and
  (ii) a local optical quality factor sensitivity matrix $L_s(i,j)$;

2) interrogating the adaptive optic by preferentially turning on selected laser sources which are directed into an entrance pupil of the adaptive optic, for recording a resultant diffraction pattern at an imaging plane;

3) taking a Fourier transform of the resultant diffraction pattern, for generating magnitude and phase components at selected pupil positions;

4) taking a Fourier transform of the resultant diffraction pattern, for generating up to N samples of magnitude and phase components, thereby forming an observation vector $$\begin{vmatrix} W_s(i) \\ 1 - L_s(i) \end{vmatrix}, i = 1, N; \text{ and}$$

5) solving for a force vector $\delta(p)$, $$|\partial p(i)| = \begin{vmatrix} W_s(i,j) \\ L_s(i,j) \end{vmatrix}^{-1} \begin{vmatrix} W_s(i) \\ 1 - L_s(i) \end{vmatrix},$$

for applying the force vector to the adaptive optic.

BRIEF DESCRIPTION OF THE DRAWING

The invention is illustrated in the accompanying drawing, in which.

DETAILED DESCRIPTION OF THE INVENTION

The Invention in its First Aspect

Figure 1:
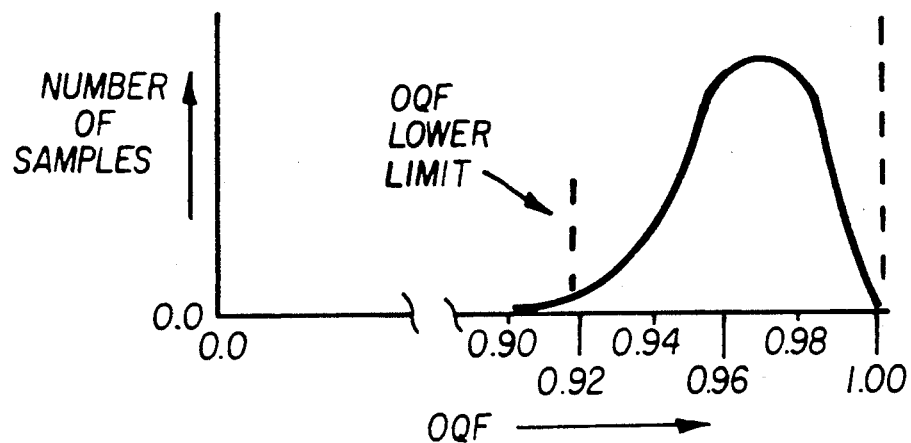
FIG. 1 shows a hypothetical OQF as obtained from a monte carlo sampling of the construction parameter error statistics.

Details on the method of the present invention in its first aspect are set forth as follows. First, the method is disclosed for a case where the augmented matrix comprises a local wavefront difference-error sensitivity matrix $W_s(i,j)$. Second, the method is disclosed for a case where the augmented matrix comprises a local optical quality factor sensitivity matrix $L_s(i,j)$ corresponding to $W_s(i,j)$. Third, the method is disclosed for a case where the augmented matrix comprises the first and second cases, viz., $$\begin{vmatrix} W_s(i,j) \\ L_s(i,j) \end{vmatrix}.$$

to yield an augmented sensitivity matrix.

Case I: The LWPA Lens Transfer Function Tolerancing System

The LWPA model is preferably expressed in matrix-vector form by a local wavefront difference error sensitivity matrix:

$$|W_s(i,j)| |\delta p(j)| = |W_s(i)| \qquad (4)$$

$|W_s(i,j)|$ is the matrix where the (i,j)-th element denotes a change in a difference between the wavefront errors (the difference-error) at pupil positions i and i−s, due to a unit perturbation $\delta p(j)$, of the j-th design construction parameter, p(j); $\delta p(j)$ is the error in the j-th parameter; and, $W_s(i)$ is a computed (e.g., ray trace) or measured (e.g., test) difference-error at the i-th and i−s-th pupil position.

$W_s(i)$, an observable, is a measured or computed difference between the pupil errors at positions i and i−s. The separation s gives predominant weight to the correction of those wavefront errors with the greatest impact on the OTF at frequency proportional to s. Note that $W(i)-W(i-s)$ is represented herein as $W_s(i)$ (see FIG. 3). It represents the response of an optic to the perturbation in terms of the difference between the errors at the i-th and (i−s)-th sample positions within the pupil. For convenience, we have let x=i to better reflect the indices conventionally associated with matrix components.

In general, for n pupil samples and m construction parameters, the sensitivity matrix (4) will consist of n rows and m columns. For illustration, the full form matrix-vector equation for three construction parameters at three sample $W_s(i)$'s in the pupil is—

$$\begin{vmatrix} W_s(1,1) W_s(1,2) W_s(1,3) \\ W_s(2,1) W_s(2,2) W_s(2,3) \\ W_s(3,1) W_s(3,2) W_s(3,3) \end{vmatrix} \begin{vmatrix} \delta p(1) \\ \delta p(2) \\ \delta p(3) \end{vmatrix} = \begin{vmatrix} W_s(1) \\ W_s(2) \\ W_s(3) \end{vmatrix} \qquad (5)$$

The next step involves a determination of the expected probability distribution for each construction parameter $\delta p(j)$. Their probability distributions can be determined on the basis of experience with the manufacturing process or on analytical considerations. Quite often, the basic Gaussian (normal) distribution is a realistic indicator of construction parameter variation. However, there are many other forms, theoretical or empirical, that can be used in the tolerancing process.

Once the probability distributions for the $\delta p(j)$'s are obtained, there are a number of methods that may be used in determining the effect of all perturbations acting concurrently. In one example, we get the perturbation vector by monte carlo of its components $\delta p(j)$ for j=1, ... m. This result, when multiplied by the construction parameter sensitivity matrix, $|W_s(i,j)|$, gives one computation of the $W_s(i)$ vector. A number of monte carlo samples, say k, will result in a corresponding number of $W_s(i)$ vectors.

At this point, we have only obtained a distribution of k−$W_s(i)$ sample vectors. We really want the expected distribution of the manufactured OTF/MTF values given the k−$W_s(i)$ sample vectors. The desired distribution can be obtained using a variety of methods. For example, an approximate approach uses the difference variance (DV), the variance of $W_s(i)$, computed as the sum of the vector components squared, $W_s^2(i)$ for i=1, n. Note that, in general, the sensitivity matrix is n×m where n is the number of rows (wavefront error difference samples) and m is the number of columns (total number construction parameters).

The computation form for one DV sample is, $$\sigma^2(\delta p, s) = \left(\frac{1}{n}\right) \sum_1^n W_s^2(i) \qquad (6)$$

where $\sigma^2(\delta p, s)$ is the mean summation of the squared components of the $W_s(i)$ vector. It is found that for reasonably small perturbations to a nominal design of a quality optic, a good approximation of the MTF is given as:

$$MTF(\delta p, s) = EXP[-2\pi\sigma^2(\delta p, s)](MTF_0(s))$$

where $MTF_D(s)$ is the diffraction limited MTF of the optic. Equation 4 can be used to compute the k monte carlo samples of $W_s(i)$. Equation 7 is then used to obtain k corresponding MTF samples that characterize the imaging performance expected of the manufacturing process.

If necessary, a more exact computation can be obtained by substituting the monte carlo sample vector $W_s(i)$ in equation 1 and integrating over i to obtain the definition OTF. Repeating the process for k samples yields the expected manufacturing yield on the basis of imaging performance. Note that this direct approach retains the full OTF; the PTF is preserved. This advantage is expanded on in subsequent sections.

If a specified percentage of say the MTF part of the OTF exceeds a lower probability limit, say the 95-th percentile, the design is acceptable. If not, a redesign is required to obtain less sensitive construction parameters, or the manufacturing tolerances must be tightened. For illustration, an example distribution is schematically shown in FIG. 1 for an OTF derivative function, the OQF, the ratio of the computed MTF to the diffraction-limited MTF for a specification spatial frequency.

As shown in FIG. 1, the specification lower limit is given as a minimal allowed OQF value of 0.92. In this distribution, in excess of 95% of the sample (local) OQF's exceed the lower limit and the design is acceptable from a manufacturing standpoint. In a global system, the average OQF only is used. In this case, one extremely low OQF sample could cause a failure of the global space value. LWPA, however, could take this extreme into account, and still allow acceptance based on the location of the sample within the pupil.

Below, we discuss two features of LWPA, first how a variation in the pupil sampling can be used as a form of data compression, and secondly, how the system can also be used for optimizing the nominal lens design construction parameters.

The Generalized LWPA and Lens Optimization System

The LWPA concept above considered two single errors separated by a distance s. We now consider multiple errors within each of two sampling apertures. This concept is shown in FIG. 2.

Figure 2:
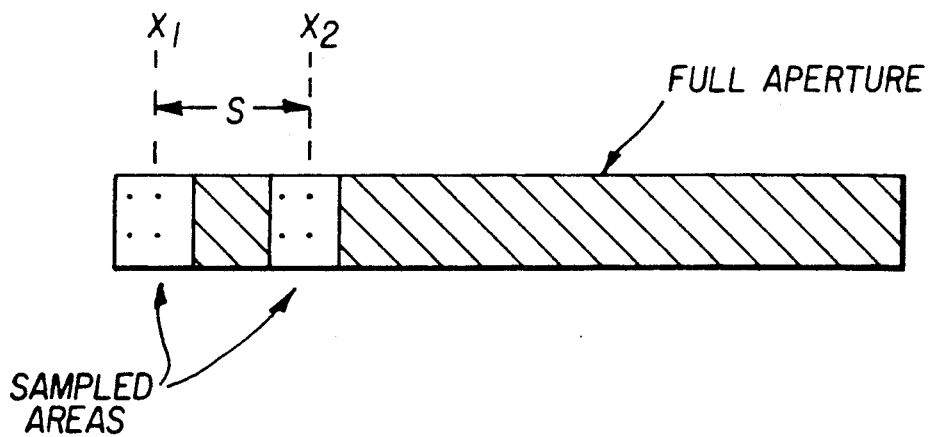
FIG. 2 shows multiple wavefront error samples in each localized wavefront performance analysis aperture.

A slit pupil is shown in FIG. 2 for simplicity. Since there are multiple errors in each LWPA aperture (4 per aperture), an additional performance parameter denoted a local optical quality factor (LOQF) can be computed as the complex autocorrelation of the errors in the two apertures. This function is indicative of the similarity of the error profile within the two disjoint sample regions.

The corresponding $W_s(i)$ (LPTF) is now computed as a difference between the average error in each region. The difference of the two mean values is the average correction required to null or phase the mean error over both sample regions. This average $W_s(i)$ is also denoted the local phase transfer (LPTF).

Case 2

A second matrix-vector relationship, based on the LOQF, (see Appendix) obtained as above, is complementary to equation 4, and is defined as a local optical quality factor sensitivity matrix:

$$|L_s(i,j)| |\delta p(j)| = |1 - L_s(i)| \quad (8)$$

$|L_s(i,j)|$ is the LOQF sensitivity matrix, where the i-th, j-th element gives the change in the LOQF at the i-th and i−s-th pupil position for a unit perturbation of the j-th construction parameter. It is complementary to the corresponding $W_s(i,j)$ value of equation 4, and in essence, it is an indication of the importance of the latter's impact on the OQF. (The vector sum of the sampled complex LOQF's are relatable to the OQF).

$|L_s(i,j)|$ is the computed or measured LOQF at the pupil sample locations (i, i−s).

In the above LOQF equation, note that the $|L_s(i)|$ vector is subtracted from $|1|$, a vector having components that are all of unity magnitude. This represents the computed LOQF vector for an aberration free optic, in that the component values which represent the LOQF at the sampled pupil positions are unity, their maximal possible value. Thus, the right hand side of the equation represents the increase in LOQF required to obtain the maximal imaging performance at spatial frequency s. For illustration purposes, the LOQF matrix-vector equation for three construction parameters and LWPA samples is—

$$\begin{vmatrix} L_s(1,1) L_s(1,2) L_s(1,3) \\ L_s(2,1) L_s(2,2) L_s(2,3) \\ L_s(3,1) L_s(3,2) L_s(3,3) \end{vmatrix} \begin{vmatrix} \delta p(1) \\ \delta p(2) \\ \delta p(3) \end{vmatrix} = \begin{vmatrix} 1 - L_s(1) \\ 1 - L_s(2) \\ 1 - L_s(3) \end{vmatrix} \quad (9)$$

The localization of the OQF to specific pupil regions using equation 9 gives additional information of importance to the designer. For example, if $1 - L_s(2)$ is the largest component in the vector, the corresponding $W_s(2)$ at pupil position 2 (computed via equation 4) represents the region with the greatest impact on the imaging quality at the frequency proportional to s. The correction process can then be designed to give the greatest weight to the correction at this position.

In contrast to the Code V System described above, LWPA can also be used to obtain estimates of the optimal nominal construction parameters required for the maximization of imaging performance. This can be obtained through the solution of equations 4 and 8 by solving for the perturbation vector necessary to achieve the maximal measured LOQF vector (all components approaching 1.00) and minimal $W_s(i)$ (all components approaching 0.00).

Case 3

There are many methods which may be used to weight the $W_s(i)$'s using the LOQF values. One method is by solving an augmented matrix, $$\begin{vmatrix} W_s(i,j) \\ L_s(i,j) \end{vmatrix} |\delta p(j)| = \begin{vmatrix} W_s(i) \\ 1 - L_s(i) \end{vmatrix} \quad (10)$$

The solution for the optimum $\delta p(j)$, denoted say $\delta^* p(j)$ is obtained by matrix inversion as—

$$|\delta p(j)| = \begin{vmatrix} W_s(i,j) \\ L_s(i,j) \end{vmatrix}^{-1} \begin{vmatrix} W_s(i) \\ 1 - L_s(i) \end{vmatrix} \quad (11)$$

It is not necessary to use the perfect imaging LOQF of 1 for the target vector. Any combination of LOQF components of values having an average which equals or exceeds the specification OQF, is satisfactory. For example, if 0.9 is the specification OQF for imaging performance at frequency s, any average vector sum of components that yields this value can represent a viable set of target vector components.

An estimate of the construction parameters that yield maximal imaging performance at frequency proportional to s may be then obtained by the appropriate algebraic addition of $\delta^* p(j)$ to the initial trial nominal lens parameter vector. These values become an optimal set of nominal parameters for maximal imaging performance at the selected object space frequency.

Finally, we note that the $L_s(i)$ values can be used to preferentially weight the corresponding $W_s(i)$ values in the correction process. If the generalized inverse is used to invert a sensitivity matrix of size n×m, then there are more equations than unknowns and a minimum-leastsquares (MLS) approach can be accomplished as a means of noise minimization and improvement in the robustness of the inversion process, where the weights can be any function of the $L_s(i)$ values. For example, the minimization of the following function will give an optimum perturbation vector, $$M(s) = \sum_{i=1}^{n} \left( F(L_s(i)) \left[ W_s(i) - \sum_{j=1}^{n} W_s(i,j)\delta p(j) \right]^2 \right) \quad (11)$$

The weighting function $F(L_s(i))$ can be any appropriate function of the LOQF that is large for LOQF values that are relatively small, and vice-versa.

Optimizing Using the Full OTF

The results of the last section implicitly includes features of the full OTF, in that $W_s(i)$ is analogous to the LPTF part and $L_s(i)$ to the amplitude part of the local OTF. This section will show that the full OTF can be explicitly used as a LWPA merit function using its real and imaginary parts. We begin with the OTF expressed in real and imaginary parts, $$OTF(s) = A^{-1} \sum_{1}^{n} a(i)a(i-s)\cos[kw_s(i)]di + \quad (12)$$

$$A^{-1}j \sum_{1}^{n} a(i)a(i-s)\sin[kw_s(i)]di$$

This expression is equivalent to equation 1, but now in a summation form consistent with the discreteness of the wavefront error sampling process. (Note that in this equation we explicitly show the aperture transmission amplitude function $a(i)$). This was not done in equation 1.) Using ray trace or test data methods an augmented matrix-vector relationship similar to equation 10 can be formed using the real and imaginary parts of the OTF, $$\begin{vmatrix} R_s(i,j) \\ I_s(i,j) \end{vmatrix} |\delta p(j)| = \begin{vmatrix} R_{sD} - R_s(i) \\ I_s(i) \end{vmatrix} \quad (13)$$

where—

$R_{sD}$ can be the diffraction-limited value for the real part of the OTF, the MTF—specifically, zero difference between errors at pupil positions i and i−s.

$R_s(i)$ is the computed or measured real part of the LOTF at pupil position i due to the difference in the pupil errors at pupil positions i and i−s.

$I_s(i)$ is the computed or measured imaginary part of the LOTF due to the difference in the pupil errors at pupil positions i and i−s.

$R_s(i,j)$ is the change in the real part of the OTF due to the change in the difference between the errors at pupil positions i and i−s for a unit perturbation of the j-th construction parameter.

$I_s(i,j)$ is the change in the imaginary part of the OTF due to the change in the difference between the errors at pupil positions i and i−s for a unit perturbation of the j-th construction parameter.

Again, a solution for the optimal perturbation of the initial nominal parameters is given as—

$$|\delta p(j)| = \begin{vmatrix} R_s(i,j) \\ I_s(i,j) \end{vmatrix}^{-1} \begin{vmatrix} R_{sD} - R_s(i) \\ I_s(i) \end{vmatrix} \quad (14)$$

In this case, the augmented matrices involve the simultaneous reduction of the real part, $R_s(i)$, and the imaginary part, $I_s(i)$, to their diffraction-limited values- the diffraction-limited MTF, $R_{sD}$, and zero respectively. This gives the increment in the initial construction parameters required, $\delta p(j)$, to obtain the optimal nominal parameters of the lens, that is $p(j)+\delta p(j)$) for $j=1$, m.

Tolerancing of the optimal parameter set would proceed as before, but now the real and imaginary parts of the OTF are obtained by monte carlo sampling of vector $\delta p(j)$ and computing $R_s(i)$ and $I_s(i)$ by its multiplication with the sensitivity matrix using equation 13.

The RMS of the real sum and the imaginary sum components will give one global MTF sample and the arctangent of the ratio of the imaginary sum to the real sum gives the corresponding global PTF (reference 1). Thus the advantage of this approach; its use of all the information inherent in the full OTF. It can be expected that the increased information will yield solutions that are more robust.

Another important advantage involves the pupil sampling inherent in LWPA. Good lens design is such that slight perturbations to optimize nominal construction parameters, will result in little change in the lower order aberrations (e.g., primary or third order). In contrast, the higher-order aberrations (e.g., secondary or fifth-order or higher) will change with moderate variation in $P(j)$, and thus serves as an early-on or precursive indication of incipient degradation (increase in low order aberrations) of imaging quality.

Figure 4:
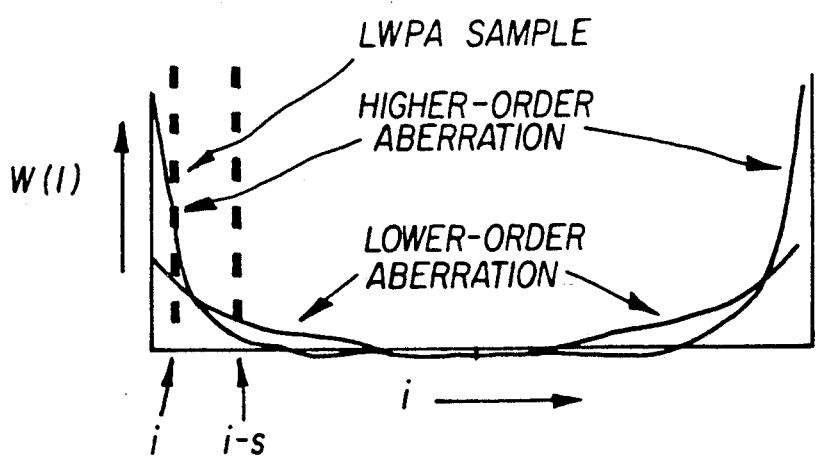
FIG. 4 shows local sampling amplification.

Unfortunately, for assessment and correction, their amplitudes are generally very small, and signal-to-noise assessment ratios are correspondingly poor. However, since the higher-order aberrations have a higher frequency spectrum within the pupil, localized sampling as inherent in LWPA can be used to enhance the low signal-to-noise by observing these samples or error extremes in the pupil (see FIG. 4). As indicated, given equal amplitudes, e.g., $W(i)=i^6$, higher order (secondary spherical) versus $w(i)=i^4$ lower order (primary spherical), it is seen that the two LWPA sampling apertures will show a greater difference, $W_s(i)$, in the errors at pupil position i and i−s, when the high-order aberration is present. Thus, the local sampling enhances the signal-to-noise ratio for the detection of incipient design error or construction parameter degradation.

In closing, a few caveats. It should be noted that the determination of the optimum $\delta p(j)$, say $\delta^*p(j)$, will likely involve a generalized inverse in that the matrix equations will often be associated with an over-determined system-fewer columns (m construction parameters) than rows (n pupil data points)—i.e. a non-square matrix. This requires the use of generalized matrix inversion and statistical techniques, such as minimum least-squares error optimization, that can be used to reduce model sensitivity to noise (measurement error, model error, etc.). However, this is not as serious a problem as it was in the past. Progress in mathematical analysis and computer technology has made the inversion of these equations relatively routine. Today, there are personal computers and techniques available that can invert matrices of 100×100 size in seconds.

Of course linearity is also assumed in the above models. Since high quality, or near diffraction-limited optics are of main concern, this is not necessarily an overly severe restriction. In this regime, the components of the vector $|L_s(i)|$ of equation 10 are all near 1.00 and the corresponding components of vector $|W_s(i)|$ are all near 0.00. This implies that the parameters are approaching that of the diffraction-limited result where linearity is favored.

The Invention in its Second Aspect

The invention in its first aspect is now concatenated to a second aspect, namely, a method for testing or controlling the performance of an adaptive optic.

By way of motivation for the second aspect, we first explain that even a perfectly fabricated optic can distort under loads such as gravity, mounting forces or temperature gradients. However, by testing a current state of an optic, or alternatively, analytically predicting a deformed shape, LWPA can be used to determine e.g., actuator forces required to compensate for a deformation and to correct an imperfect surface.

To this end, the second aspect of the present invention may be used in process control to test a current state of an optic. Then, the LWPA may be used for determining where to polish the optic, thereby improving its surface.

After an optic is fabricated, certain fabrication errors may remain. The second aspect of the present invention may then be employed to test a current state of an optic. Then, the LWPA may be used to determine where to push, and how hard, to improve the performance of the optic.

Figure 5:
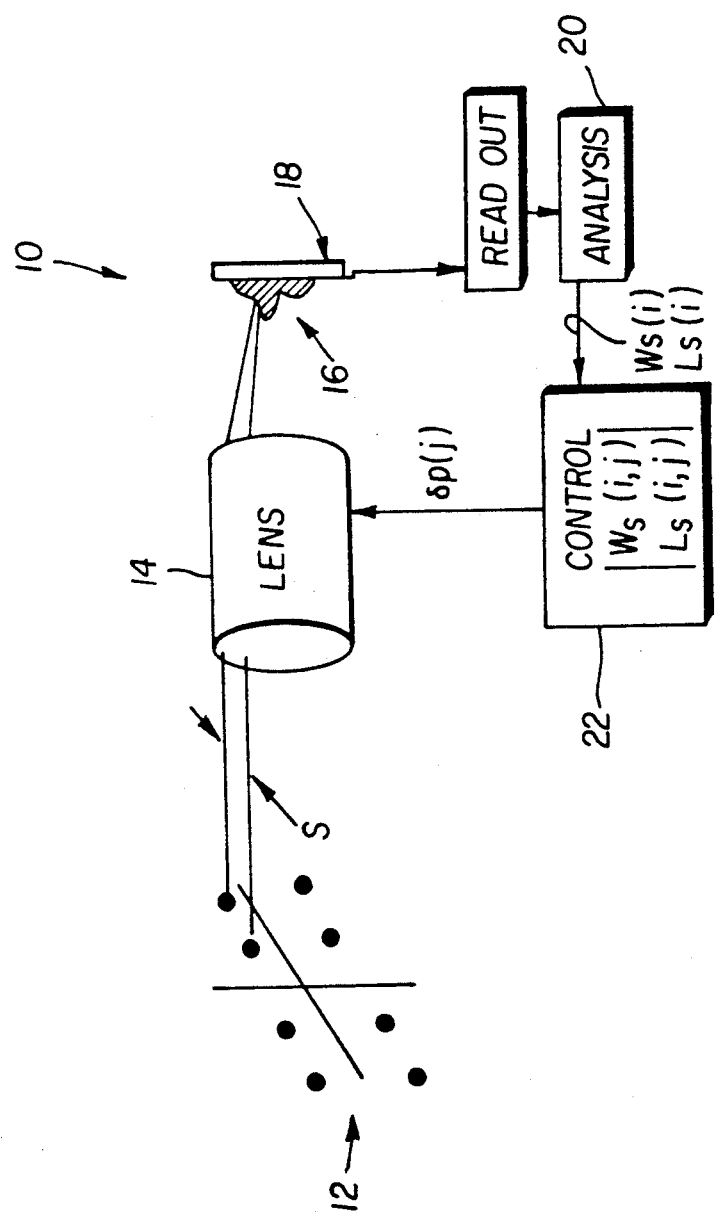
FIG. 5 shows an assembly suitable for testing or controlling a performance of an adaptive optic.

Attention is now directed to FIG. 5, which shows an assembly 10 for realizing the invention in its second aspect. The assembly 10 includes an array of conventional laser sources 12. Note that an aperture plate may be alternatively used. An adaptive optic 14 to be tested, is positioned to intercept a programmed combination of laser sources (e.g., pairs separated by distance s), thereby developing a diffraction pattern signature 16 at a conventional radiation detector 18, for the traversed local regions of the optic 14.

These results are augmented with other local samples (N) by a deterministic programming of the laser sources 12 (again, with spacing s).

This process yields a development of a complete difference-error vector for the current optic configuration—shown in FIG. 5 as output values of an indicated analysis box 20.

Control mechanism, actuator or process control (box 22) parameters are based on the sensitivity matrix as indicated, and in conjunction with the analysis input, can solve for the required parameter changes that can improve or maintain a high performance quality of the optic 14. Correction signals, $\delta p(j)$, are determined by an equation, repeated as 15

$$|\delta p(j)| = \begin{vmatrix} W_s(i,j) \\ L_s(i,j) \end{vmatrix}^{-1} \begin{vmatrix} W_s(i) \\ 1 - L_s(i,j) \end{vmatrix},$$

which are then preferably sent to effector mechanisms that drive the optic 14 parameters to an optimum imaging performance value.

APPENDIX: RELATIONSHIP BETWEEN LOCAL PARAMETERS $W_s(i)$, $L_s(i)$ AND THE GLOBAL WAVEFRONT ERROR $W(i)$

A connection between LWPA and the global OTF is fundamentally the same as that between that of a single sample value of the autocorrelated complex pupil function and its summation integral over the optical exit pupil as represented by equation 1 of this paper. Equation 12 also indicates that the global OTF is (to a good approximation) a function of a summation of LOTF samples over the common or overlapping region of the pupil, the finite-difference form of equation 1. (The relationship between the separate samples in the summand and the OTF is delineated in reference 1). Since the OTF is complex, it is composed of real and imaginary parts which define the well-known MTF and the corresponding PTF which are computed as—
1) The MTF is the RSS of the real and imaginary parts of the OTF and—
2) The PTF is the angle associated with the arctangent of the ratio of these parts.

The MTF is generally the function primarily used in the assessment of global imaging performance. It describes the attenuation of the object spatial frequencies over the complete bandpass of the lens. The PTF part is usually ignored as inconsequential, a fact only true for highly-corrected imagers. The CODE V system, by its squaring of the OTF removes the PTF from consideration. However, the LWPA system investigates performance over relatively small regions of the pupil where phase errors (at a selected spatial frequency) are generally not averaged out via the integration of equation 1 or, in finite form, by the summation of equation 12. The resulting global PTF is essentially the algebraic sum of all the local phase samples, the local PTF's (LPTF's), (symbolically written as $W_s(i)$ in this paper) and as shown in the integrand of this equation. The following FIG. 3 schematically describes the distinction between the local and global OTF performance functions.

Figure 3:
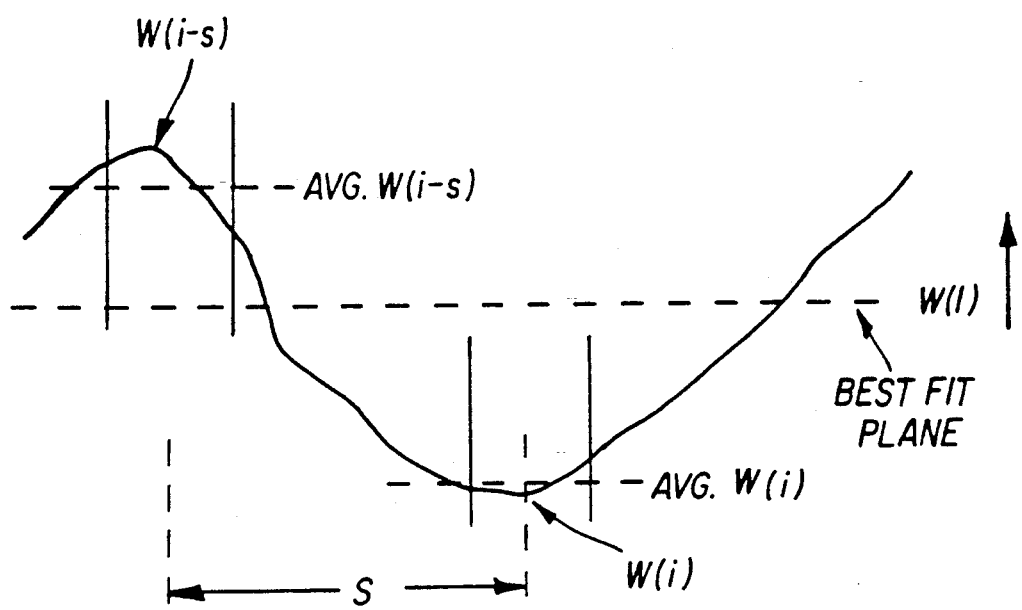
FIG. 3 shows a relationship of difference-error or LPTF to the global PTF.

FIG. 3 indicates an arbitrary wavefront error function, $W(i)$, and a LWPA sample of the local errors at positions i and i—s. As shown, the local PTF, denoted herein as $W_s(i)$, is given by the difference between the average errors in the two LWPA samples. In contrast, the global OTF involves the integration of all the sample $W_s(i)$ values over the common or over-lap regions of the pupil. In contrast, the global PTF involves the averaging of $W_s(i)$ over the total aperture shown in the figure.

In addition to $W_s(i)$ the LWPA also yields a factor denoted as the LOQF, symbolically expressed as $L_s(i)$ in equation 8. This parameter is related to the degree of correlation of the $W(i)$ errors in the two pupils. For example, if the errors in the two regions are described by the same function, there would be perfect correlation. In this event, $L_s(i)$ would approach 1.00, a result indicative of a perfect (diffraction-limited) wavefront-the two local regions have identical error distributions. Note that in a near-perfect wavefront the errors in each of the sample regions will always be highly correlated. In FIG. 3, the two sample regions are quite different, and thus $L_s(i)$ is significantly less than 1.00. It thus serves as a means of quantifying the importance of the contribution of the local errors within the sample apertures to the global OTF. A small value (much less than 1.00) indicates that $W_s(i)$ contributes significantly (relatively) to the degradation of the global OTF, and thus explains its use in the weighting factor, $F(L_s(i))$, in the design optimization merit function (equation 11). $F(L_s(i))$ would be large for relatively small $L_s(i)$, and small for $L_s(i)$ approaching 1.00.

What is claimed:

1. A method for testing or controlling a performance of an adaptive optic comprising the steps of:

1) generating from the adaptive optic an augmented matrix $$\begin{vmatrix} W_s\ (i,j) \\ L_s\ (i,j) \end{vmatrix}$$

comprising:
(i) a local wavefront difference-error sensitivity matrix $W_s(i,j)$; and
(ii) a local optical quality factor sensitivity matrix $L_s(i,j)$;

2) interrogating the adaptive optic by preferentially turning on selected laser sources which are directed into an entrance pupil of the adaptive optic, for recording a resultant diffraction pattern at an imaging plane;

3) taking a Fourier transform of the resultant diffraction pattern, for generating magnitude and phase components at selected pupil positions;

4) taking a Fourier transform of the resultant diffraction pattern, for generating up to N samples of magnitude and phase components, thereby forming an observation vector $$\begin{vmatrix} W_s(i) \\ 1 - L_s(i) \end{vmatrix},\ i = 1,N;\ \text{and}$$

5) solving for a force vector $\delta p(i)$, $$\delta p(i) = \begin{vmatrix} W_s\ (i,j) \\ L_s\ (i,j) \end{vmatrix}^{-1} \begin{vmatrix} W_s\ (i) \\ 1 - L_s\ (i,j) \end{vmatrix},$$

for applying the force vector to the adaptive optic.

* * * * *